(12) United States Patent
Heien et al.

(10) Patent No.: US 10,908,172 B2
(45) Date of Patent: Feb. 2, 2021

(54) COLLECTION AND PROCESSING OF ANALYTICAL DATA

(71) Applicant: Arizona Board of Regents on Behalf of the University of Arizona, Tucson, AZ (US)

(72) Inventors: Michael Heien, Tucson, AZ (US); Drew Farrell, Hillsboro, OR (US)

(73) Assignee: Arizona Board of Regents on Behalf of the University of Arizona, Tucson, AZ (US)

(*) Notice: Subject to any disclaimer, the term of this patent is extended or adjusted under 35 U.S.C. 154(b) by 0 days.

(21) Appl. No.: 16/748,358

(22) Filed: Jan. 21, 2020

(65) Prior Publication Data

US 2020/0232998 A1     Jul. 23, 2020

Related U.S. Application Data

(60) Provisional application No. 62/794,057, filed on Jan. 18, 2019.

(51) Int. Cl.
*G01N 35/00* (2006.01)
*H04N 19/117* (2014.01)
*G06F 16/21* (2019.01)

(52) U.S. Cl.
CPC ....... *G01N 35/00584* (2013.01); *G06F 16/21* (2019.01); *H04N 19/117* (2014.11)

(58) Field of Classification Search
CPC ..... G01N 35/00584; G01N 2035/0091; H04N 19/117; G06F 16/21
USPC ....................................................... 341/155
See application file for complete search history.

(56) References Cited

U.S. PATENT DOCUMENTS

| 8,116,936 B2* | 2/2012 | Hershey | F02D 41/249 |
| | | | 701/32.2 |
| 10,534,019 B2* | 1/2020 | Pupalaikis | G01R 13/208 |

* cited by examiner

*Primary Examiner* — Khai M Nguyen
(74) *Attorney, Agent, or Firm* — Thomas|Horstemeyer, LLP

(57) ABSTRACT

A self-contained hardware platform can be used for the instruction of analog signal processing techniques. An exemplary hardware platform includes a bit depth module, a noise generation module, a signal filter module, and a lock-in amplifier module. In this way, the hardware platform is capable of performing experiments for the instruction of noise source elucidation, Nyquist sampling and resolution, analog filtering, and/or lock-in amplification, among others.

20 Claims, 13 Drawing Sheets

COLLECTION AND PROCESSING OF ANALYTICAL DATA

CROSS-REFERENCE TO RELATED APPLICATION

This application claims priority to U.S. provisional application entitled, "Collection and Processing of Chemical Data," having Ser. No. 62/794,057, filed Jan. 18, 2019, which is entirely incorporated herein by reference.

BACKGROUND

Analytical chemistry generally includes hours of experiments performed in a laboratory. The overall analytical process can be learned through hands-on work with the laboratory equipment. The arrangement and assembly of tools for the collection of data can be time consuming, especially for students with little to no experience.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Disclosed herein are various embodiments related to the collection and processing of laboratory analytical data, such as data from experiments involving chemistry, physics, engineering, etc. Methods, systems, and apparatuses for collection and processing of laboratory analytical data are presented. A combination of hardware (analog and digital circuitry) and software can be used to facilitate the collection and processing of data during analytical experiments. In one embodiment, the hardware can include a power supply (juice box), a bit depth module (bit box), a noise generation module (chatter box), a signal filter module (filter box), and/or a lock-in amplifier module (lock box). A graphical user interface (GUI) can be used to facilitate the operation of the hardware and display the results. The use of an integrated collection and processing system can simplify and benefit the instruction of users, such as students in an academic setting.

In accordance with various embodiments, a self-contained hardware platform can be used for the instruction of analog signal processing techniques. This populated circuit board can be capable of, but not limited to, performing experiments for the instruction of (1) noise source elucidation, (2) Nyquist sampling and resolution, (3) analog filtering, and (4) lock-in amplification. Each module can include custom input and output connections, and the entire instrument can be powered by an on-board power supply (juice box) via a micro USB (or another type of connector) for increased access and ease-of-use. The modules can be used individually or can be configured and reconfigured to be used collectively using the input and output connections external to the board or input and output terminals within the circuit board, along with switches (e.g., slide switches) and adjustable circuit elements (potentiometers, trimpots, etc.) internal to the board.

Figure 1A:
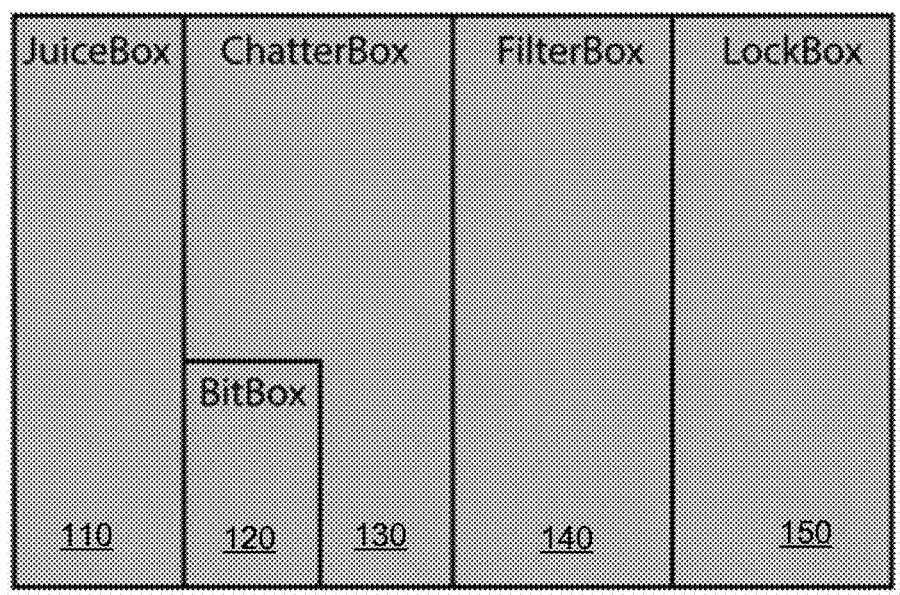
FIGS. 1A-1B show an exemplary circuit board layout and a physical implementation for an embodiment of a hardware platform in accordance with embodiments of the present disclosure.
Figure 1B:
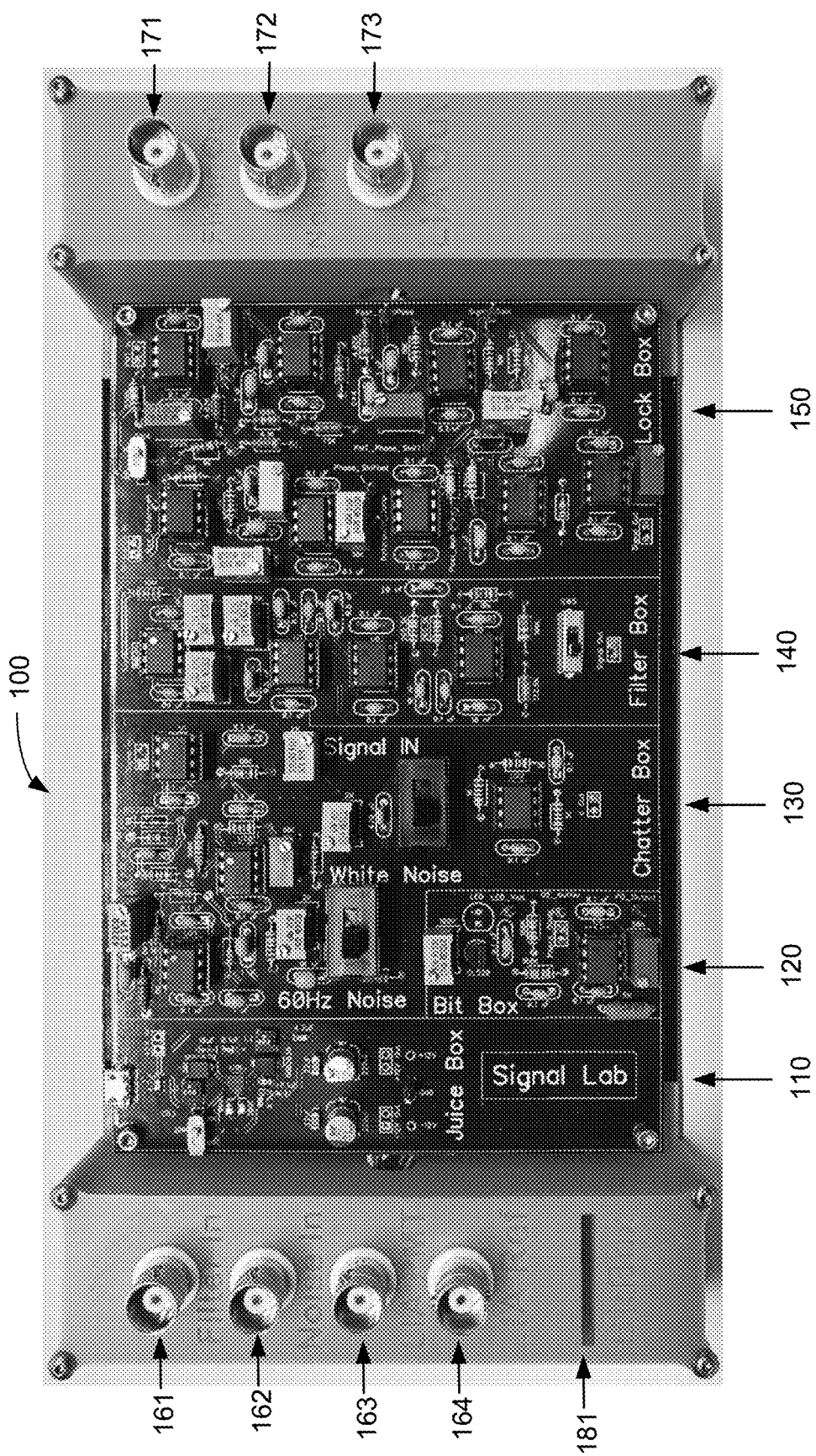

FIGS. 1A-1B show an exemplary circuit board layout and a physical implementation for an embodiment of the hardware platform 100 that includes the power supply module 110 (juice box or "JuiceBox"), a bit depth module 120 (bit box or "BitBox"), a noise generation module 130 (chatter box or "ChatterBox"), a signal filter module 140 (filter box or "FilterBox"), and/or a lock-in amplifier module 150 (lock box or "LockBox"). Accordingly, FIG. 1B provides an image of an exemplary implementation of the hardware platform 100 with various external input and output connections. In an exemplary embodiment, the input connections include a Filter In 161, a Noise In 162, an LIA PMT 163 (Lock-In Amplifier PhotoMultiplier Tube), and an LIA Ref 164 (Lock-In Amplifier Reference) signal connections. Correspondingly, the output connections 170 include a Filter Out 171, Noise Out 172, and LIA Out 173. Other interfaces to the modules may also be included in various embodiments, such as an interface opening 181 to insert a transparency filter within a light path of the bit depth module 120.

Figure 2:
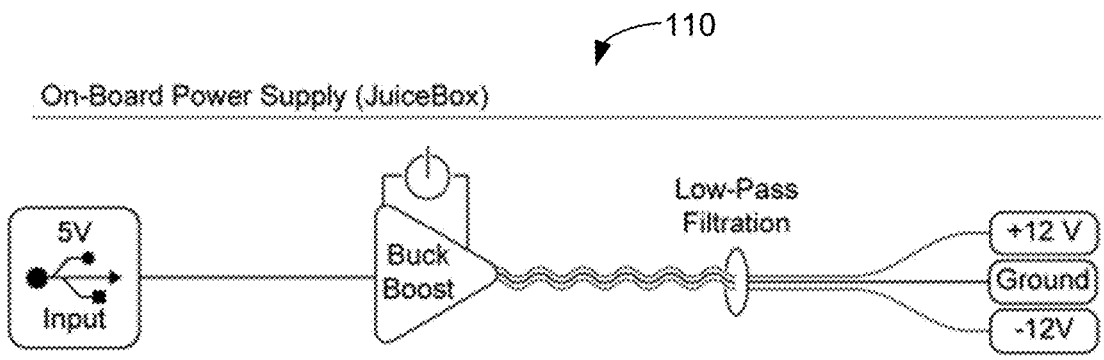
FIG. 2 illustrates a schematic of exemplary circuitry for an on-board power supply of the hardware platform of FIGS. 1A-1B.

FIG. 2 illustrates a schematic of exemplary circuitry for the on-board power supply 110 in one embodiment. As shown, the power supply can include buck/boost conversion and low-pass filtering to provide a controlled voltage for operation of the other modules.

Figure 3:
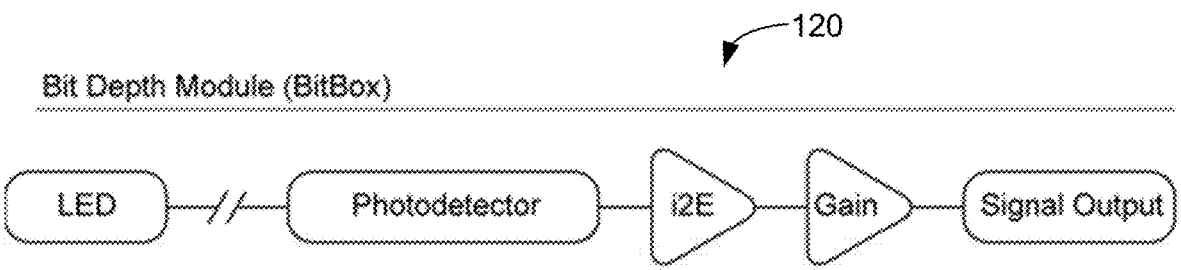
FIG. 3 shows a schematic of exemplary circuitry for a bit depth module of the hardware platform of FIGS. 1A-1B.

FIG. 3 shows a schematic of exemplary circuitry for the bit depth module 120 in one embodiment. The circuitry of the bit depth module 120 can include a light emitting diode (LED) and photodetector for data collection at different bit resolutions, which can be selected though a graphical user interface (GUI). The effects of sampling, resolution, and bit noise can be illustrated using this module 120 in various experiments or lessons. Additionally, a controllable gain can provide adjustment of the output signal.

Figure 4:
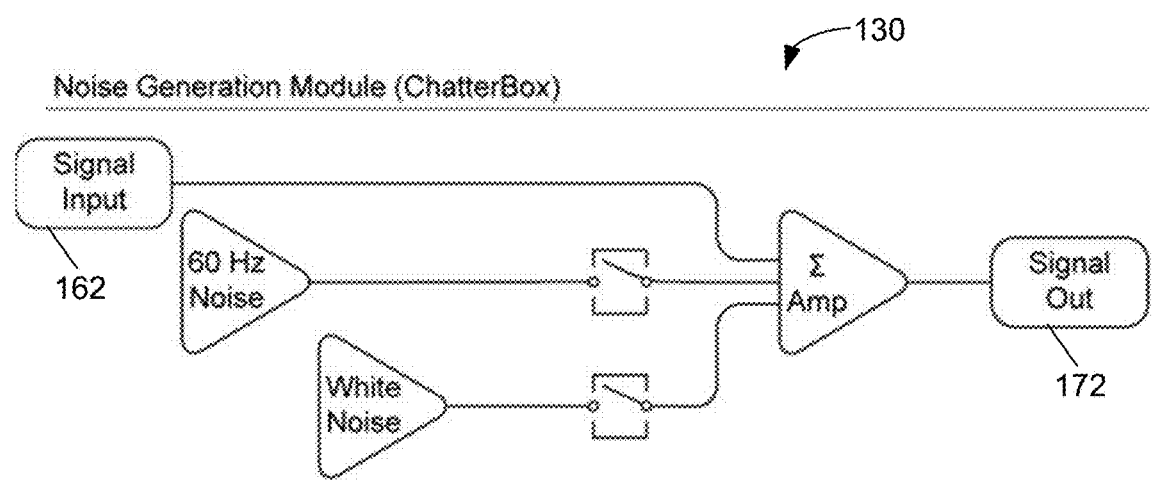
FIG. 4 illustrates a schematic of exemplary circuitry for a noise generation module of the hardware platform of FIGS. 1A-1B.

FIG. 4 illustrates a schematic of exemplary circuitry for the noise generation module 130. Circuitry of the noise generation module 130 can be configured to combine an input signal 162 (from a signal source such as analog function generator, oscilloscope, etc.) with a selected noise signal. In various embodiments, an input or noise signal can be electronic or optical and can be supplied by various devices, such as, but not limited to, a transducer, sensor, controller, function generator, lock-in amplifier, photodiode, optical diode, optical switch, accelerometer, piezoelectric transducer, etc. from a laboratory experiment. For example, white noise and/or a fixed frequency (e.g., 60 Hz) noise signal can be combined with the input signal 162 by a summing amplifier. A graphical user interface (GUI) can be used to display and/or adjust the amplitude, frequency and/or drift of the noise signals. Sensors can be used to measure temperature, pressure, electrical conductivity, obtaining or detecting measures of composition, such as spectroscopy, etc. in chemical experiments, among others.

Figure 5A:
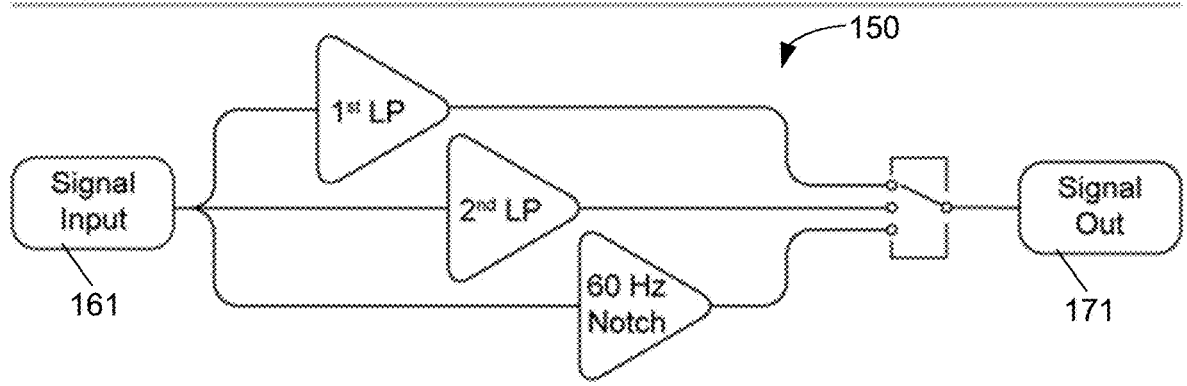
FIG. 5A shows a schematic of exemplary circuitry for a signal filter module of the hardware platform of FIGS. 1A-1B.
Figure 5B:
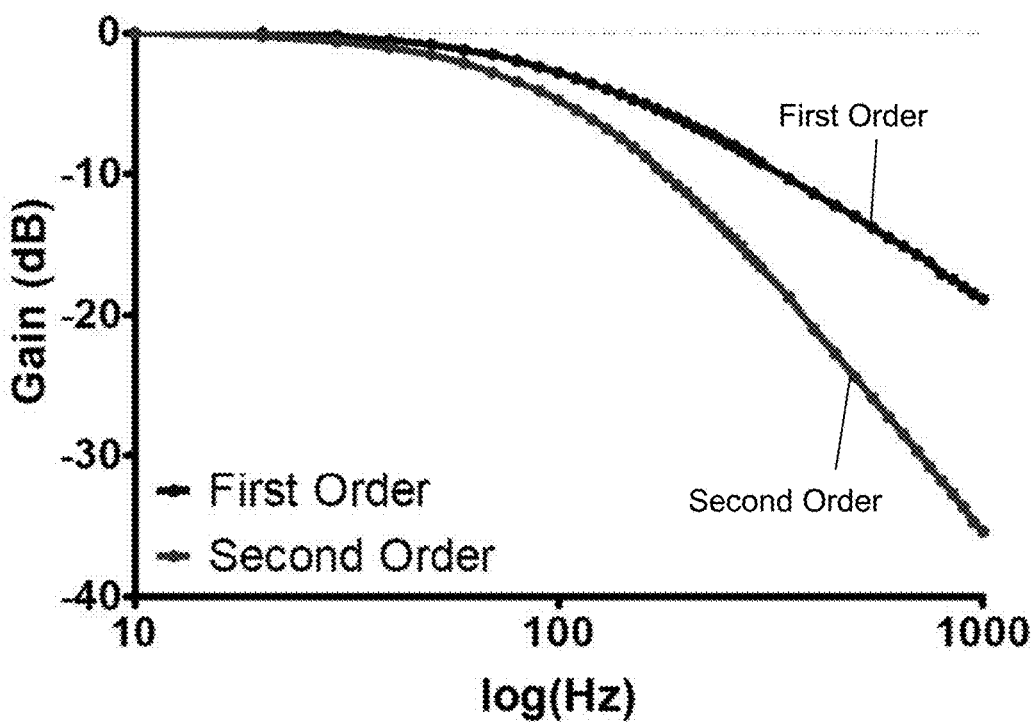
FIG. 5B depicts a characterization of an exemplary first order response for an analog first low pass filter and a characterization of a second order response for an analog second low pass filter of a signal filter module of the hardware platform of FIGS. 1A-1B.
Figure 5C:
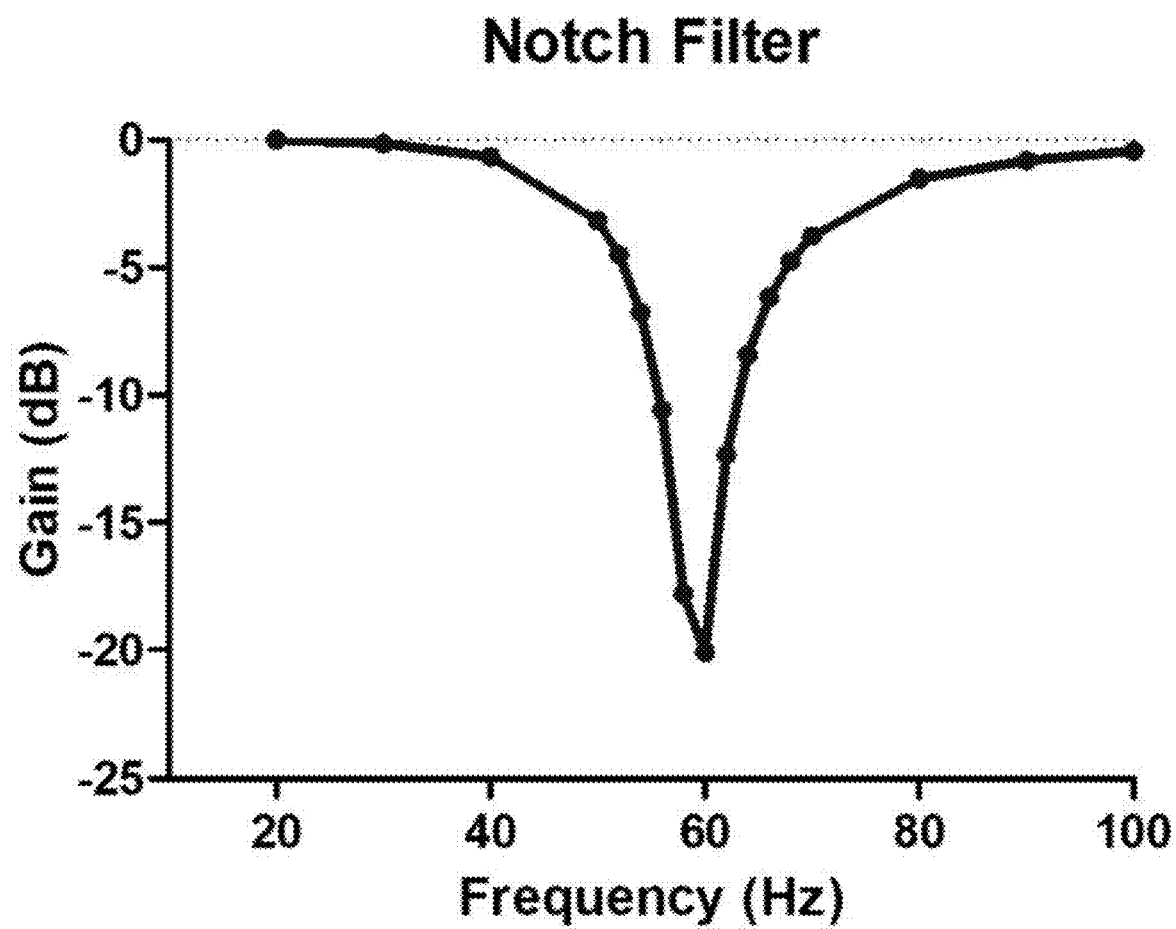
FIG. 5C a characterization of a response for a notch filter of the signal filter module of the hardware platform of FIGS. 1A-1B.

Next, FIG. 5A shows a schematic of exemplary circuitry for the signal filter module 140. Circuitry of the signal filter module can be configured to filter an input signal 161 (from a signal source such as analog function generator, oscilloscope, etc.) with using one of different selectable filter circuits (via a switch). The filters can include different orders of low pass filter, notch filters, or other filters as desired. A graphical user interface (GUI) may be used to display and/or adjust characteristics of the filters. In one embodiment, the signal filter module contains a first order low pass filter ($1^{st}$ LP), a second order low pass filter ($2^{nd}$ LP), and a notch filter. Accordingly, FIG. 5B is a graph depicting the characterization of an exemplary first order response for an analog first low pass filter ($1^{st}$ LP) at 18.1 dB/decade and the characterization of a second order response for an analog second low pass filter ($2^{nd}$ LP) at 36.4 dB/decade. Correspondingly, FIG. 5C shows a characterization of a response for the notch filter (e.g., 60 Hz).

Figure 6A:
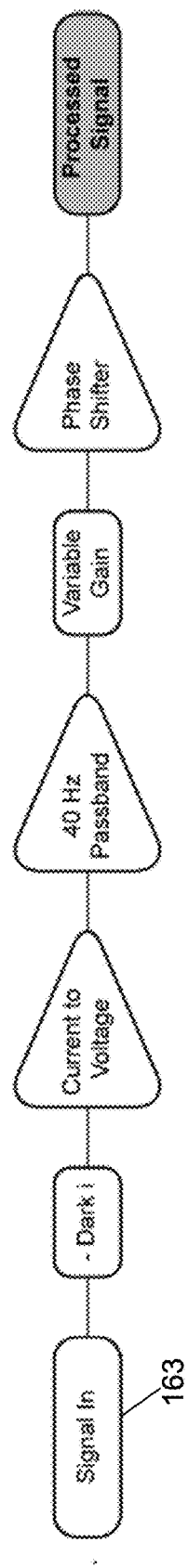
FIGS. 6A-6C illustrate schematics for a lock-In amplifier module of the hardware platform of FIGS. 1A-1B.
Figure 6B:
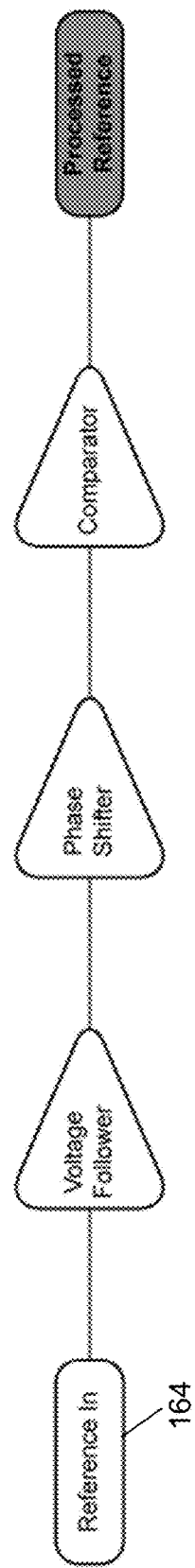
Figure 6C:
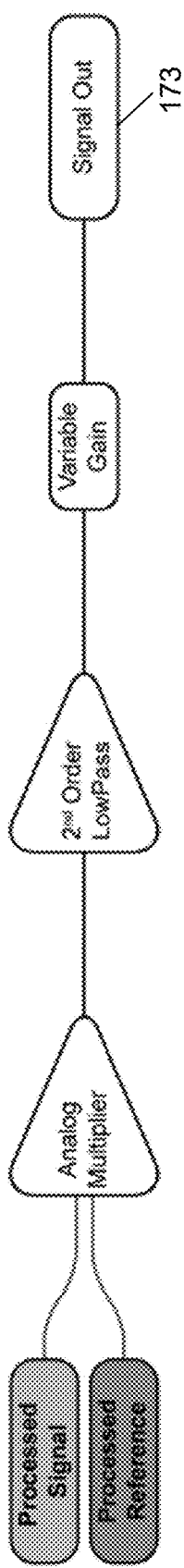

Circuitry of the lock-in amplifier (LIA) module 150 can be configured to receive signals from an analytical test setup and generate an LIA output signal based upon a comparison of an LIA input signal 163 (from a signal source such as analog function generator, oscilloscope, etc.) with a reference signal 164 (from a signal source such as analog function generator, oscilloscope, etc.). Accordingly, FIGS. 6A-6C illustrate schematics for the lock-In amplifier module 150. Correspondingly, FIG. 6D shows an exemplary experiment setup 600 for the lock-in amplifier module in accordance with embodiments of the present disclosure, whereas FIG. 6E provides an image of a physical implementation of the experimental setup of FIG. 6D.

Figure 6D:
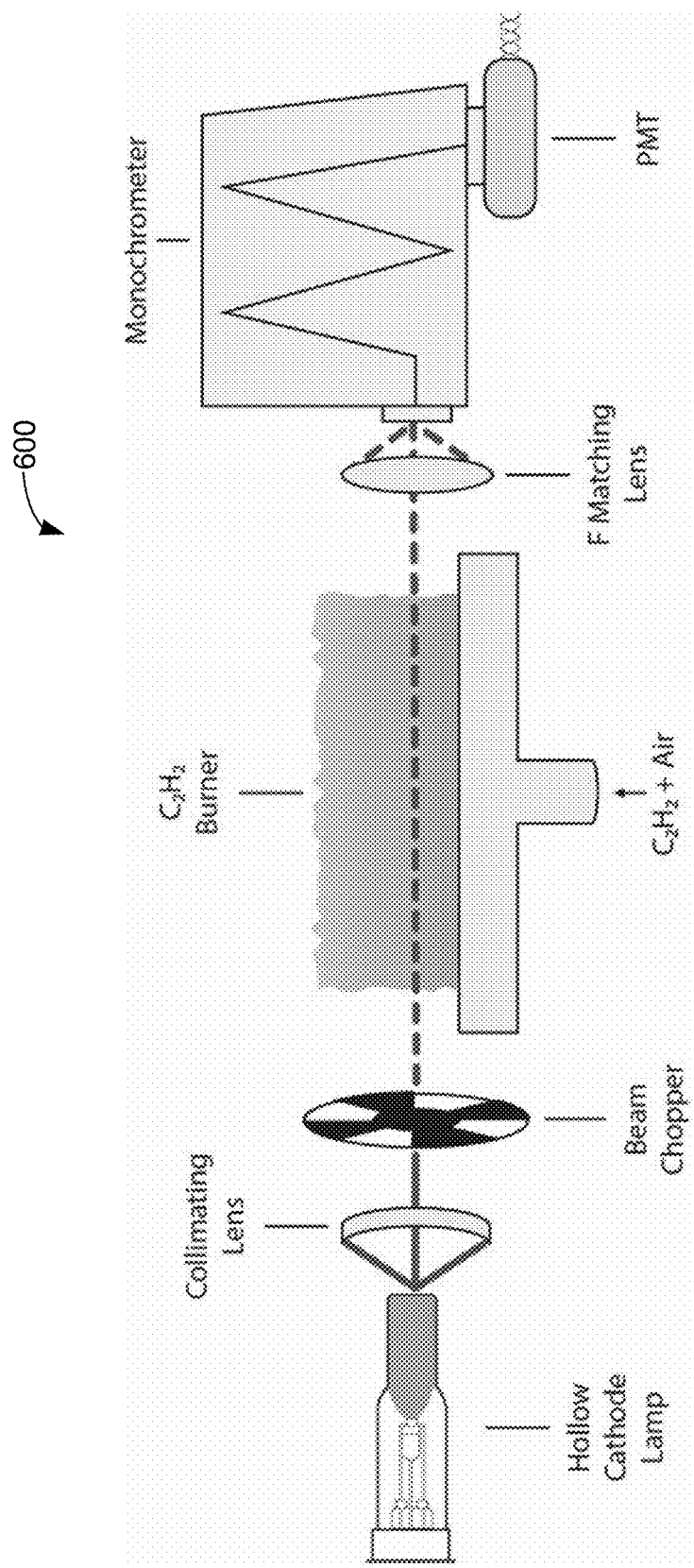
FIG. 6D shows an exemplary experiment setup for the lock-in amplifier module in accordance with embodiments of the present disclosure.
Figure 6E:
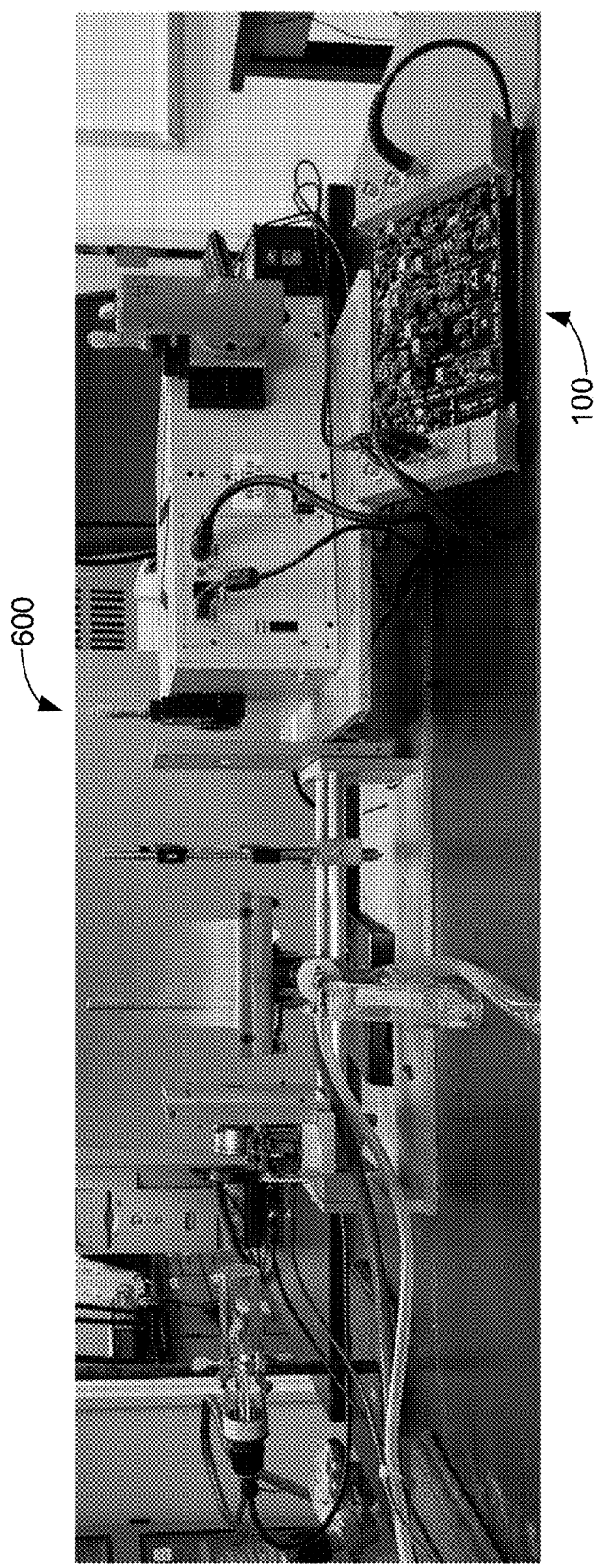
FIG. 6E presents an image of a physical implementation of the experimental setup of FIG. 6D.

In the experiment setup, the LIA input signal can be provided by a photomultiplier tube (PMT) that receives pulsed light that passed through an ionized sample and a monochrometer, as shown in FIG. 6D. The pulsed light can be produced using a beam chopper operating at a defined frequency (e.g., 40 Hz). The circuitry of the LIA module can correct for dark current in the LIA input signal 163 from the PMT, as shown in FIG. 6A. Accordingly, the LIA input signal 163 can be processed by a dark current corrector, current-to-voltage converter, passband filter, variable gain and phase shifter to produce a processed input signal. The reference signal ("Reference In") 164 can be provided by the beam chopper at the defined frequency, and processed by a voltage follower, phase shifter and comparator to produce a processed reference signal, as shown in FIGS. 6B and 6D. The current-to-voltage converter, variable gain and phase shifter processing the LIA input signal 163 and the phase shifter and comparator processing the reference signal 164 can be adjusted to align the processed signal and the processed reference for comparison, as shown in FIGS. 6A-6C. An analog multiplier can combine the processed signal and processed reference, which can be filtered and amplified by a variable gain to produce the LIA output signal 173 ("Signal Out"), as shown in FIG. 6C.

Various software applications, executed by a computer system, can be used with the hardware platform 100 for data collection, signal processing, and analysis (DAPA), such as those created using the LabVIEW programming platform. In one embodiment, one or more graphical user interfaces (GUI) can be used to facilitate use of the hardware platform or use of other National Instruments hardware to facilitate data digitization. Such an exemplary software suite, in accordance with the present disclosure, is designed for teaching or educational purposes to provide a tool for Data Acquisition, Processing, and Analysis (DAPA), a tool for noise simulation or emulation that can simulate noise (via software) and add the noise to an input signal, and/or a tool for displaying model solutions to project assignments (referred as a "Hello World" program). The exemplary educational software suite (ESS) is capable of collecting data from one or multiple channels (of a data acquisition device (DAQ)) that is coupled to both the hardware platform 100 and a computing system executing the ESS) at applicable rates and voltages; artificially reducing a resolution of recorded or stored data signals (e.g., for teaching purposes); filtering data with a plurality of filtering options including high pass, low pass, band pass, and band stop filters; smoothing data using moving average filtering, Savitzky-Golay filtering, or median filtering; calculating signal statistics including averages, standard deviations, variance, median, mode, minimum, and maximum values; correcting for constant and variable baseline shifts, perform frequency analysis via Fast Fourier Transforms (FFT); graphing data for visualization and output, perform derivative analysis; etc.

In accordance with embodiments of the present disclosure, an exemplary educational software suite can be used in a research setting or to enable educational objectives. To illustrate, an exemplary system can collect and store data from one or multiple channels, and can be acquired at various sample rates, times, voltage ranges and data types, in which the data can be stored for later analysis by the educational software suite. For example, FFT and derivative analysis can be performed with the results visually displayed. Data manipulation such as baseline correction, digital filtering and data smoothing can also be implemented. An exemplary graphical user interface (GUI) can provide graphical display(s) of input and processed data for comparison. The GUI can enable the use of the hardware platform for data collection and analysis in both educational and research settings.

Figure 7:
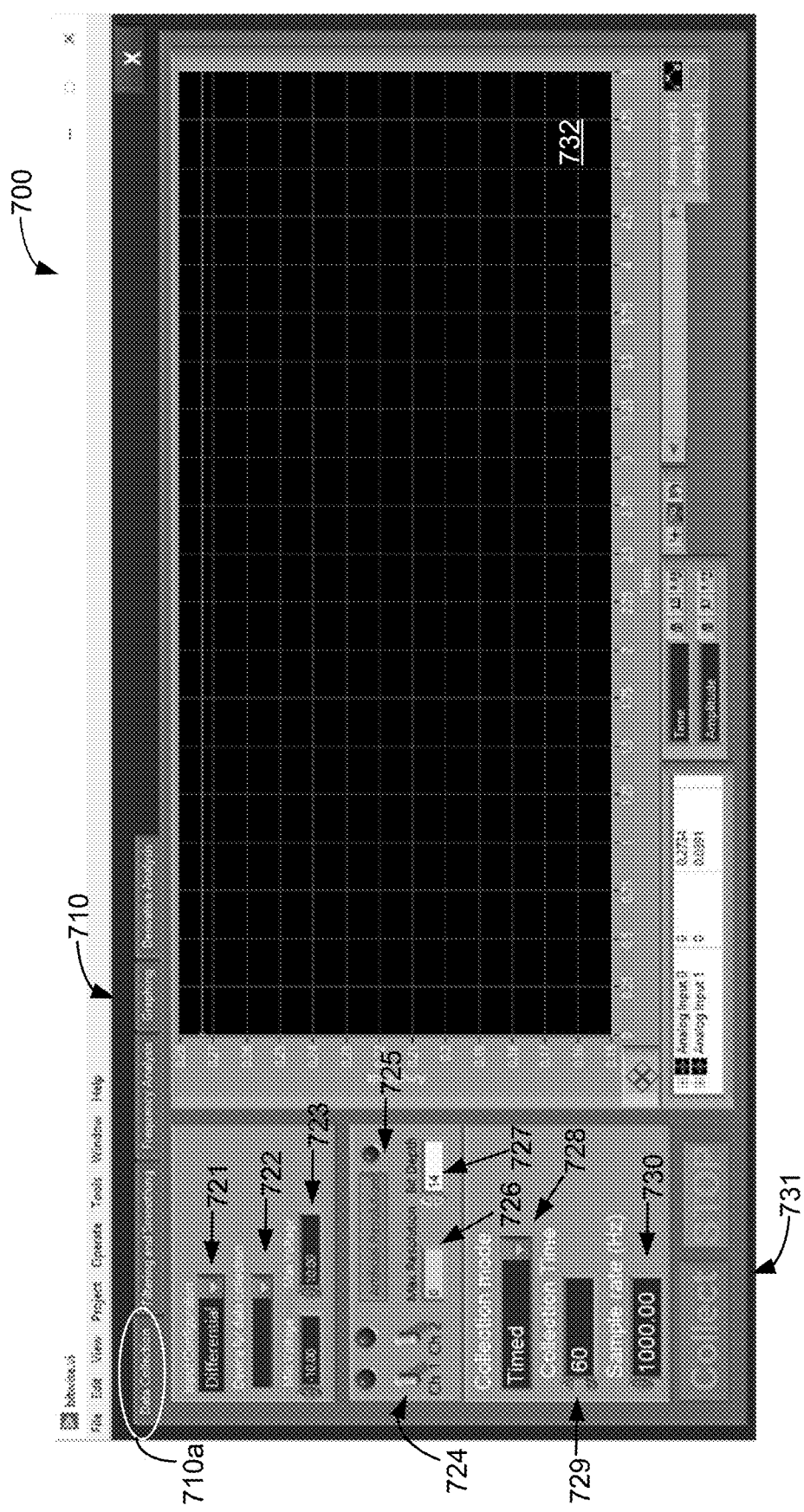
FIG. 7 presents a screenshot of an exemplary graphical user interface for a data acquisition, processing, and analysis software tool in accordance with embodiments of the present disclosure.

FIG. 7 presents a screenshot 700 of an exemplary graphical user interface for the data acquisition, processing, and analysis (DAPA) tool in accordance with embodiments of the present disclosure. Various tabs 710 are provided at the top of the user interface for Data Collection, Filtering and Smoothing, Frequency Analysis, Graphing, and Derivative Analysis to enable selection of controls and specification of inputs to be made to perform various analyses, as discussed above. In FIG. 7, the Data Collection tab 710a has been activated such that an interface screen is presented with various controls or inputs, including an input configuration dropdown menu 721, a dropdown menu 722 to select a DAQ device, input boxes 723 to specify a voltage range, toggle switches 724 to activate or select channels for receiving an input signal from a selected DAQ device, a control/button 725 for enabling artificial resolution processing, an input box 726 to specify a maximum resolution, an input stepper control 727 to specify a bit depth value, a collection mode dropdown menu 728, an input stepper control 729 to specify a collection time, an input stepper control 730 to specify a sample rate in Hertz, control buttons 731 to start and stop the collection of data, and a graph display 732 to show a representation or characterization of collected or processed data. Thus, via the DAPA tool, multi-channel data can be stored, and user-selected sample rates and time frames can be set. Multiple signal processing tools including Fourier transforms, filtering, multi-order derivatives, smoothing, baseline subtraction, and graphing can be used on stored data.

Figure 8:
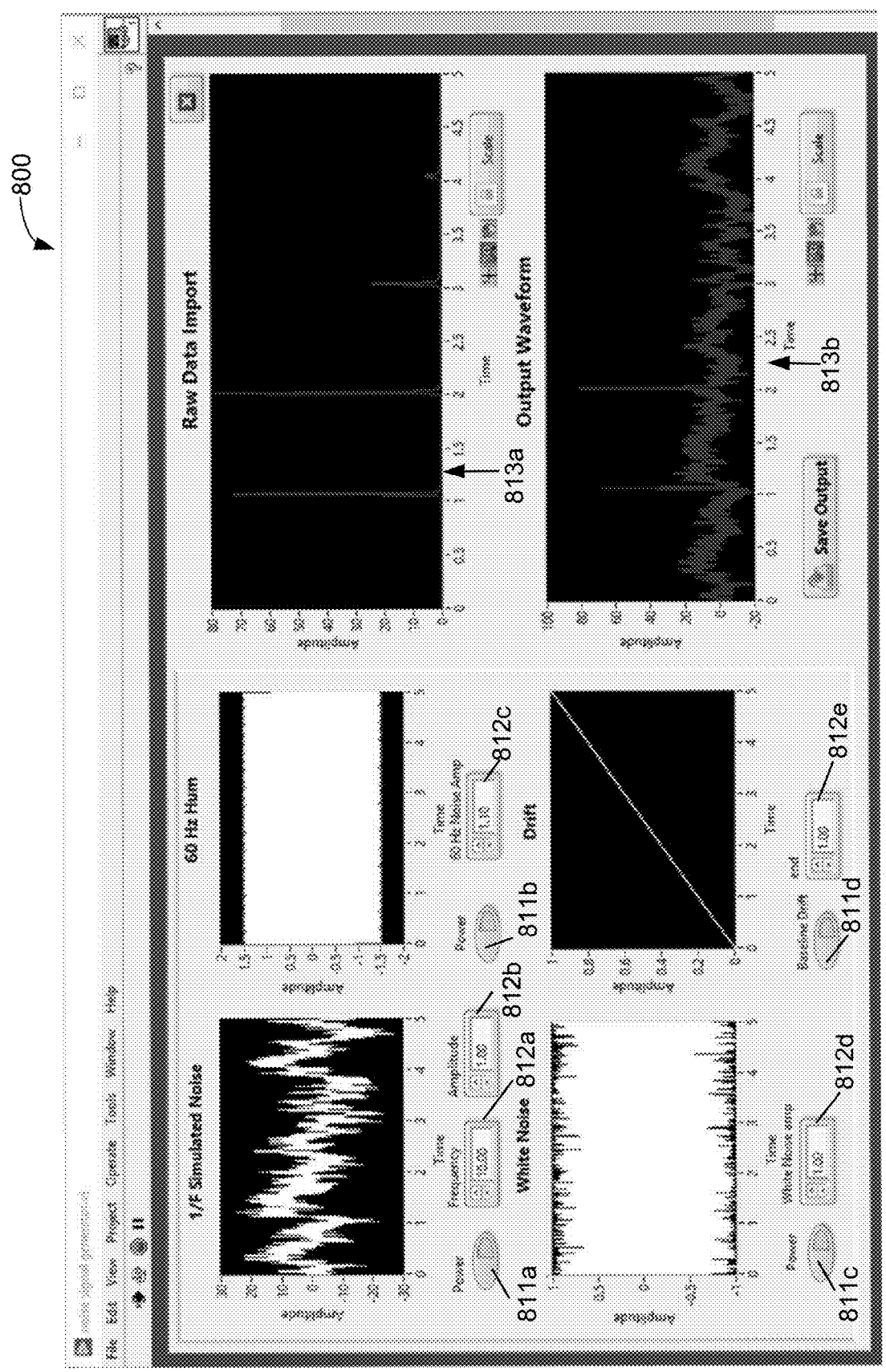
FIG. 8 presents a screenshot of an exemplary graphical user interface for a noise simulation software tool in accordance with embodiments of the present disclosure.

FIG. 8 presents a screenshot of an exemplary graphical user interface 800 for the noise simulation tool in accordance with embodiments of the present disclosure. Using the tool, a variety of noise signals (e.g., 1/F, 60 Hz, white noise, and baseline drift) can be added to an input signal to illustrate the effects on test data. As shown in the figure, power controls 811a-d are provided to activate various noise simulation techniques to a recorded signal, including 1/F Simulated Noise, 60 Hz Hum, White Noise, and Drift Noise. Selector controls (e.g., input stepper controls) 812a-e are additionally provided to select desired features or characteristics of the simulated noise signal, such as a frequency, amplitude, or time/period values. Further, graph displays 813a-b can be presented to show the recorded or imported signal with (bottom display) and without (top display) the noise simulation.

Figure 9:
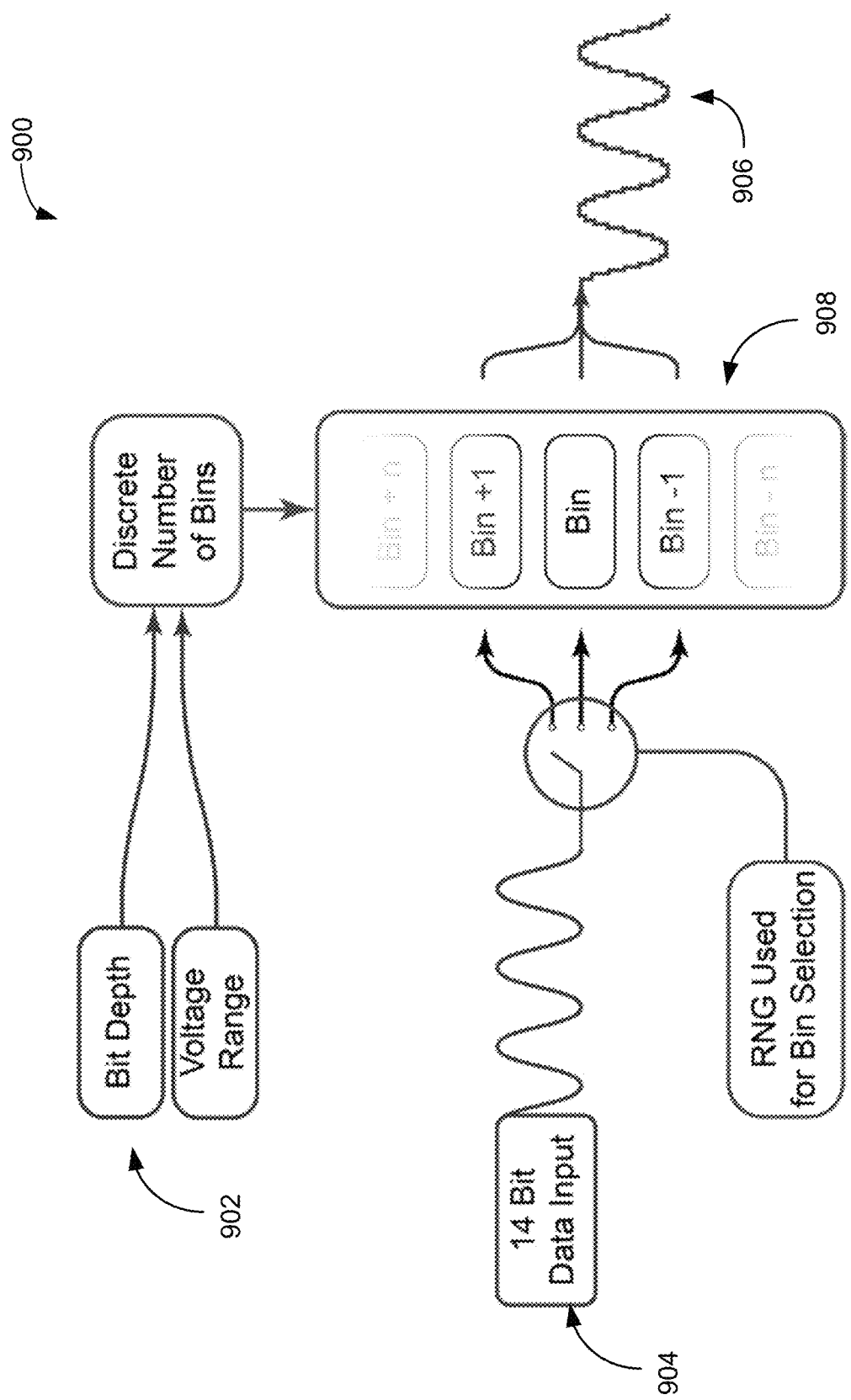
FIG. 9 shows a process flow for artificial data resolution using an exemplary embodiment of the data acquisition, processing, and analysis software tool for a sample experiment.

Via the DAPA tool, artificial resolution of a data signal can be provided by converting sampled signals to lower bit levels. FIG. 9 shows a process flow 900 of an exemplary embodiment of artificial data resolution using the DAPA tool for a sample educational experiment. For example, as previously discussed, the bit depth module 120 includes a light source (LED) and a detector (photodiode). During the experiment, transparency filters of varying % Black Coverage (% BC) can be inserted in the light path (via the interface path opening 181) to change the amount of light incident on the detector. The light incident on the detector is related to the % BC as described by Beer's Law. The output voltage from the detector, which is an analog signal, is proportional to the incident light intensity. The user performing the experiment can measure the output voltage directly (with aid of a program, such as the DAPA tool). To perform the experiment, the bit depth module 120 is set at a desired bit depth value (902) (with aid of a program, such as the bit depth input stepper control 727 in the DAPA tool) and an artificial resolution control 725 can be activated (with aid of a program, such as the DAPA tool). During the experiment different bit depth values (e.g., 6, 8, 10, 12, and 14 bits) can be selected and tested to explore the effect of bit depth on the measurement precision and accuracy of the output voltage. Referring to the figure, the DAPA tool converts the input analog data signal (904) to an output digital signal (906) at the selected bit depth value, wherein the available number of bins (908) to represent a sample of the input signal is dependent upon the selected bit depth. Subsequent statistical analysis may then be performed, such as exploring the relationship between the standard deviation of the output signals and changing bit depth values.

Figure 10:
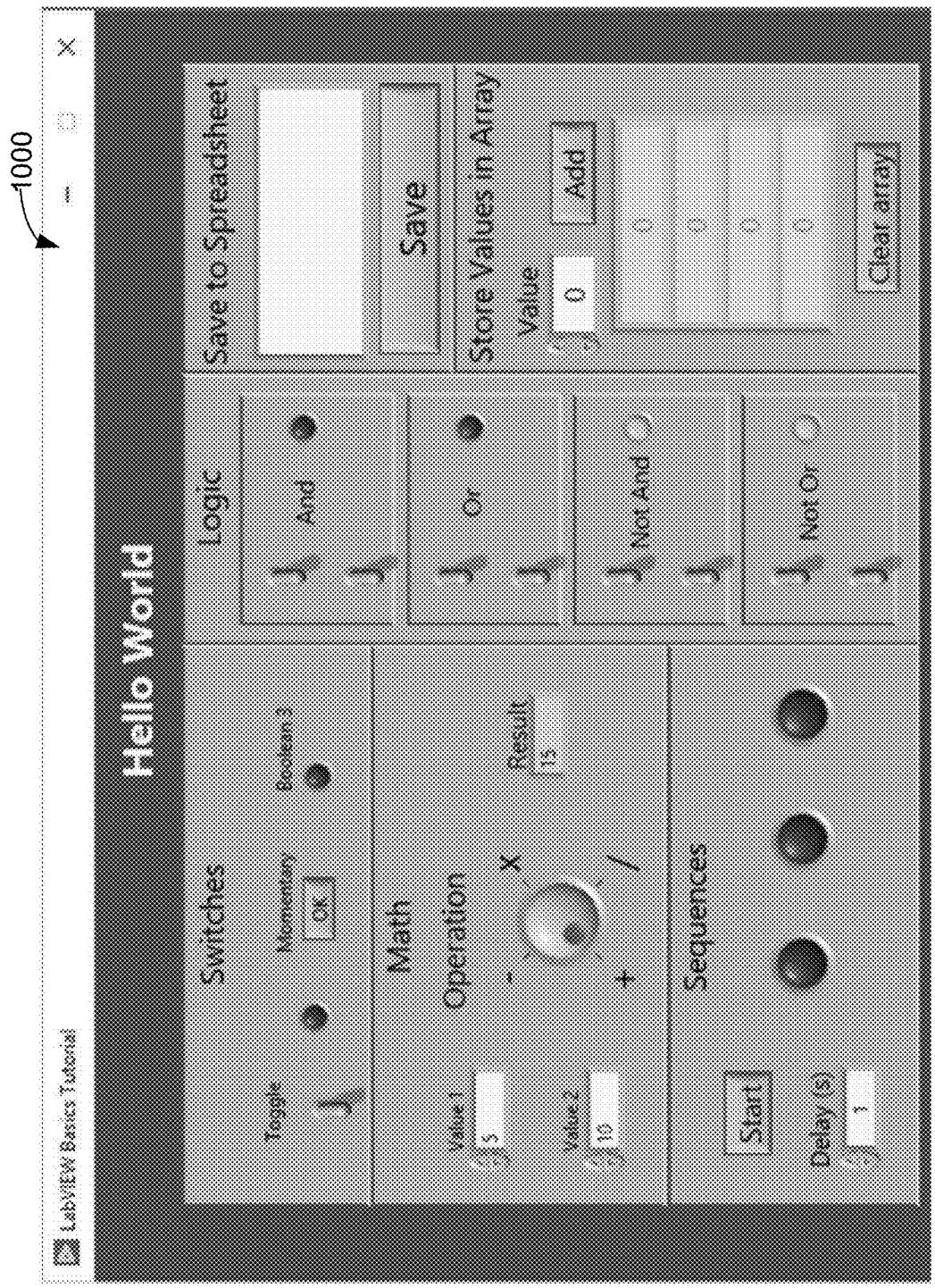
FIG. 10 presents a screenshot of an embodiment of a Hello World interface for a sample graphical programming assignment in accordance with embodiments of the present disclosure.

Various embodiments of the educational software suite may also feature a tool for displaying model solutions to project assignments (referred as a "Hello World" program). Accordingly, FIG. 10 presents a screenshot of an embodiment of the Hello World interface 1000 for a sample graphical programming assignment, in which a user is tasked to design a software interface capable of performing a variety of operations, and the interface 1000 provided in FIG. 10 represents a possible solution to the assignment as a reference to the user. Other tools and functions may be included as part of the educational software suite in accordance with embodiments of the present disclosure.

Figure 11:
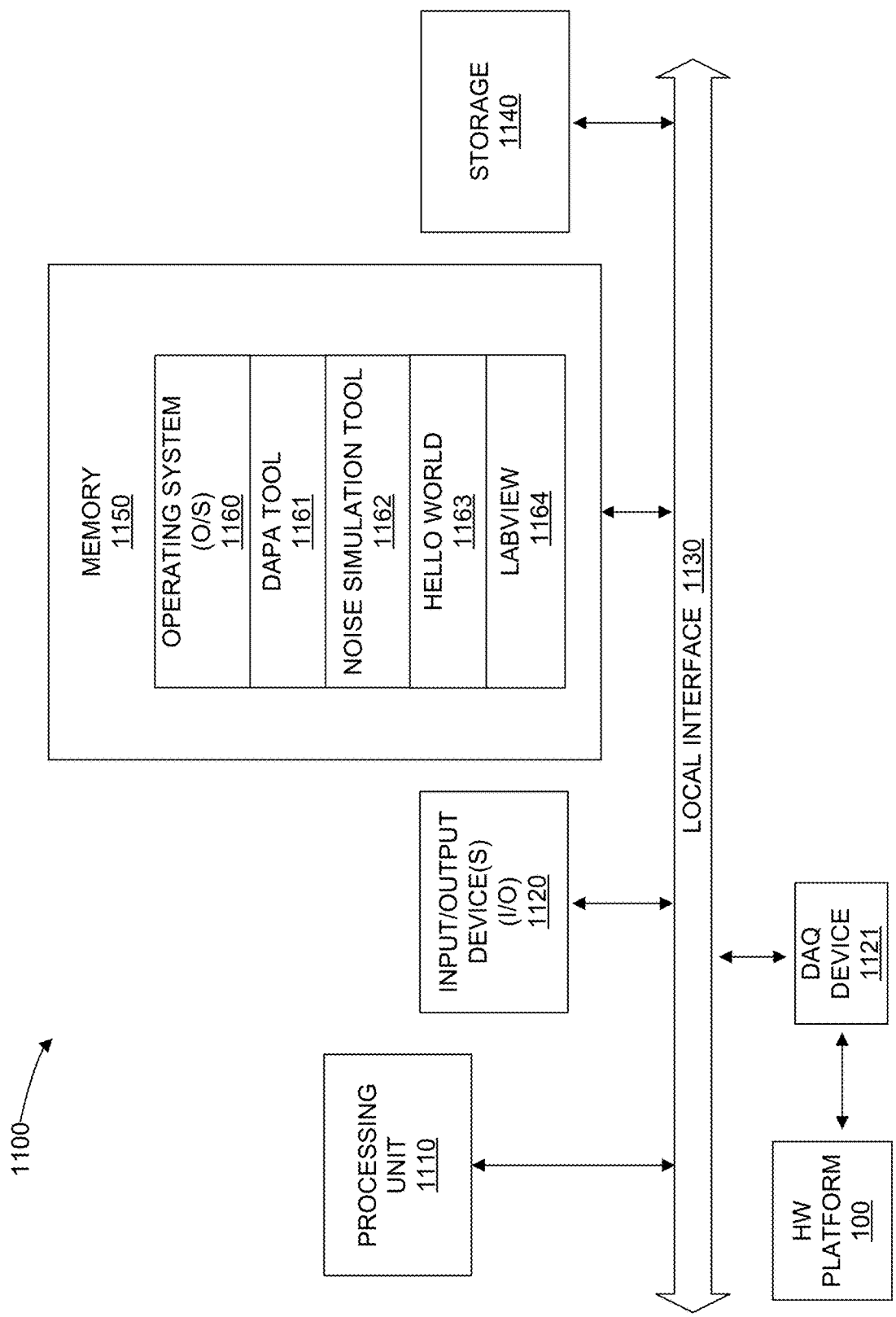
FIG. 11 is a block diagram of an exemplary computing system in accordance with embodiments of the present disclosure.

FIG. 11 is a block diagram illustrating an example of a computing system 1100 in accordance with various embodiments of the present disclosure. The system 1100 can be implemented on a computer and may include a processing unit 1110 (e.g., central processing unit (CPU)) and one or more input/output devices 1120 (e.g., a display/monitor, keyboard, mouse, printer, scanner, etc.), such as a DAQ device 1121 (coupled to an exemplary hardware platform 100) that are communicatively coupled via a local interface 1130 and permit a user to interact with software instructions being executed by the system 1100. The system 1100 may further include a persistent storage device 1140, such as a hard disk, a tape drive, an optical disk system, a removable disk system, or the like, and a memory 1150. The processing unit 1110 may control the persistent storage device 1140 and memory 1150. In one embodiment, a software application may be stored in the persistent storage device 1140 and may be loaded into the memory 1150 when the software application is to be executed by the processing unit 1110. In such an example, the memory 1150 may contain a suitable operating system (O/S) 1160, a DAPA tool 1161, a noise simulation tool 1162, a Hello World program 1163, a LabVIEW platform 1164, etc., in accordance with embodiments of the present disclosure.

The various software, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. In addition, the scope of certain embodiments of the present disclosure includes functionality being embodied in hardware or software-configured mediums.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system for collection and processing of analytical data, comprising:
   reconfigurable processing circuitry implemented on a common platform, the reconfigurable processing circuitry comprising:
      a signal filter module comprising circuitry configured to selectively filter a filter input signal; and
      an at least one additional module, wherein the at least one additional module comprises at least:
         a bit depth module comprising circuitry configured to convert an analog signal to a digital signal having a controllable number of bits;
         a noise generation module comprising circuitry configured to combine a controllable noise signal with a noise input signal; or
         a lock-in amplifier (LIA) module comprising circuitry configured to generate an LIA output signal from an LIA input signal and a reference signal aligned with the LIA input signal.

2. The system of claim 1, wherein the at least one additional module comprises the bit depth module.

3. The system of claim 2, wherein the circuitry of the bit depth module generates the digital signal at a selected number of bits using down conversion.

4. The system of claim 2, wherein the controllable number of bits is 14-bits or less.

5. The system of claim 1, wherein the at least one additional module comprises the noise generation module, wherein the circuitry of the noise generation module comprises a white noise generator and a fixed frequency noise generator, wherein the controllable noise signal comprises a white noise signal, a fixed frequency noise signal, or both.

6. The system of claim 1, wherein the circuitry of the signal filter module is configured to select between filtering by a low pass (LP) filter and filtering by a notch filter.

7. The system of claim 1, wherein the additional module comprises the LIA module, wherein circuitry of the LIA module receives the LIA input signal from a photomultiplier tube (PMT) and receives the reference signal from a beam chopper providing pulsed light to the PMT via a monochrometer.

8. The system of claim 7, wherein the circuitry for the LIA module comprises dark current correction circuitry that receives the LIA signal from the PMT.

9. The system of claim 7, wherein the circuitry for the LIA module comprises at least one phase shifter for aligning the LIA input signal with the reference signal.

10. The system of claim 1, further comprising a graphical user interface (GUI) executed on a computing device in communication with the reconfigurable processing circuitry, wherein the GUI is configured to control operation of the reconfigurable processing circuitry, wherein the GUI is configured to graphically display information collected and processed by the reconfigurable processing circuitry.

11. The system of claim 1, further comprising one or more input connections to receive a signal from a signal source and one or more output connections to output a signal from one or more of the signal filter module, noise generation module, and the lock-in amplifier module.

12. The system of claim 11, wherein the at least one additional module comprises the bit depth module, the system further comprising an interface path opening within a light path of the bit depth module that is configured to receive a transparency filter.

13. The system of claim 11, wherein the signal source comprises a sensor that generates a data signal corresponding to a chemical measurement.

14. The system of claim 13, wherein the chemical measurement comprises a measurement of temperature, pressure, electrical conductivity, or composition of matter.

15. The system of claim 1, wherein the at least one additional module comprises the bit depth module, wherein the bit depth module includes a light emitting diode and photodetector for detecting light emitted from the light emitting diode.

16. A method of analyzing a data signal comprising:
   receiving an analog signal from a signal source;
   processing the analog signal through a hardware platform, the hardware platform comprising:
      a signal filter module comprising circuitry configured to selectively filter a filter input signal; and
      at least one additional module, wherein the at least one additional module comprises at least:
         a bit depth module comprising circuitry configured to convert an analog signal to a digital signal having a controllable number of bits;
         a noise generation module comprising circuitry configured to combine a controllable noise signal with a noise input signal; or
         a lock-in amplifier (LIA) module comprising circuitry configured to generate an LIA output signal from an LIA input signal and a reference signal aligned with the LIA input signal;
   coupling an output signal from the hardware platform to a computing device; and
   simulating effects on the output signal via one or more software tools executed on the computing device, the effects including a simulated noise signal being added to the output signal and/or a sampling of the output signal at different bit resolutions.

17. The method of claim 16, wherein the additional module comprises the bit depth module, wherein the bit depth module includes a light emitting diode and photodetector for detecting light emitted from the light emitting diode, the method further comprising inserting a transparency filter in a light path of the bit depth module and measuring an amount of light that is detected by the photodetector.

18. The method of claim 16, wherein the output signal is generated from the signal filter module, the method further comprising selecting the analog signal to be filtered by a low pass filter or a notch filter of the signal filter module.

19. The method of claim 16, wherein the output signal is generated from the signal filter module, the method further comprising selecting the analog signal to be filtered by a first order low pass filter, a second order low pass filter, or a notch filter of the signal filter module.

20. The method of claim 16, wherein the output signal is generated from the noise generation module, the method further comprising selecting white noise and/or a fixed frequency noise to be added to the analog signal.

* * * * *